United States Patent
McCall et al.

(10) Patent No.: US 7,542,322 B2
(45) Date of Patent: Jun. 2, 2009

(54) BUFFERED CONTINUOUS MULTI-DROP CLOCK RING

(75) Inventors: James A. McCall, Beaverton, OR (US); Clinton F. Walker, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/956,397

(22) Filed: Sep. 30, 2004

(65) Prior Publication Data

US 2006/0083103 A1 Apr. 20, 2006

(51) Int. Cl.
*G11C 5/00* (2006.01)
*G11C 8/00* (2006.01)

(52) U.S. Cl. ............... 365/52; 365/194; 365/233.1; 365/233.11; 365/233.12; 365/233.13

(58) Field of Classification Search .......... 365/52, 365/51, 63, 194, 233, 233.1, 233.11, 233.12, 365/233.13; 327/291, 105; 714/42; 711/100
See application file for complete search history.

(56) References Cited

U.S. PATENT DOCUMENTS

| | | | |
|---|---|---|---|
| 5,390,147 | A | 2/1995 | Smarandoiu et al. |
| 5,495,435 | A * | 2/1996 | Sugahara ............... 365/52 |
| 5,712,811 | A * | 1/1998 | Kim ................... 365/63 |
| 5,786,732 | A * | 7/1998 | Nielson ................ 327/105 |
| 5,867,448 | A * | 2/1999 | Mann .................. 365/52 |
| 5,872,959 | A | 2/1999 | Nguyen et al. |
| 5,917,760 | A | 6/1999 | Millar |
| 6,034,878 | A * | 3/2000 | Osaka et al. ............ 365/52 |
| 6,115,318 | A | 9/2000 | Keeth ................. 365/233 |
| 6,262,940 | B1 * | 7/2001 | Choi et al. ............. 365/233 |
| 6,434,081 | B1 * | 8/2002 | Johnson et al. ......... 365/233 |
| 6,438,015 | B2 * | 8/2002 | Kyung ................. 365/52 |
| 6,477,614 | B1 | 11/2002 | Leddige et al. |
| 6,654,270 | B2 | 11/2003 | Osaka et al. |
| 6,687,780 | B1 | 2/2004 | Garlepp et al. |
| 6,717,832 | B2 * | 4/2004 | Johnson et al. .......... 365/52 |
| 6,724,666 | B2 * | 4/2004 | Janzen et al. ........... 365/233 |
| 6,724,685 | B2 * | 4/2004 | Braun et al. ........... 365/233 |
| 6,744,124 | B1 | 6/2004 | Chang et al. |
| 6,747,891 | B2 | 6/2004 | Hoffmann et al. |
| 6,845,436 | B1 * | 1/2005 | Wu .................... 365/233 |

(Continued)

FOREIGN PATENT DOCUMENTS

WO   WO/2005101164   10/2005

OTHER PUBLICATIONS

U.S. Appl. No. 11/516,824, Mailed Sep. 19, 2008, 12 pages.

*Primary Examiner*—Trong Phan
(74) *Attorney, Agent, or Firm*—Blakely, Sokoloff, Taylor & Zafman LLP

(57) ABSTRACT

A method, system and apparatus to distribute a clock signal among a plurality of memory units in a memory architecture. A buffer chip is coupled to a plurality of memory units each by a point to point link. The buffer chip includes a clock generator to generate a continuous free running clock that may be passed serially through a subset of memory units in the architecture. Sending of data is delayed over the point to point links based on proximity of the memory units to the buffer chip to accommodate delay in the multidrop clock signal.

4 Claims, 3 Drawing Sheets

U.S. PATENT DOCUMENTS

| | | | |
|---|---|---|---|
| 6,845,460 B2 * | 1/2005 | Lee et al. | 365/233 |
| 6,937,494 B2 * | 8/2005 | Funaba et al. | 365/52 |
| 6,972,981 B2 * | 12/2005 | Ruckerbauer et al. | 365/52 |
| 6,980,042 B2 * | 12/2005 | LaBerge | 327/291 |
| 6,996,749 B1 * | 2/2006 | Bains et al. | 714/42 |
| 7,111,108 B2 * | 9/2006 | Grundy et al. | 711/100 |
| 7,154,809 B2 | 12/2006 | Gregorius et al. | |
| 2004/0105292 A1 | 6/2004 | Matsui | |

* cited by examiner

BUFFERED CONTINUOUS MULTI-DROP CLOCK RING

BACKGROUND

1. Field of the Invention

Embodiments of the invention relate to power and performance in computer memory systems. More specifically, embodiments of the invention relate to providing a clocking signal within a memory subsystem.

2. Background

The power performance relationship in the personal computer (PC) environment continues to pressure platform designers to improve power at minimal cost. Unfortunately, to accommodate legacy dynamic random access memory (DRAM) using the industry standard double data rate 2 (DDR2) feature set early fully buffered dual in line memory modules (DIMM) (FBD) require higher power levels and prior evolutionary approaches as a result of the addition of a buffer chip. This feature set is defined in JEDEC Standard DDR2 SDRAM Specification JESD79-2A, published January 2004 (the DDR2 Standard). Moreover, the DDR2 feature set limited the ability to enable features in the buffer-DRAM interface to reduce power and improve performance at lower cost.

Existing designs use an architecture with bi-directional strobes generated from the buffer chip to the DRAM. In this design, one output strobe is required per DRAM, the strobe design results in timing problems at higher speeds which is due to the uncertainty caused by drift effects between issue commands and N unit intervals until it is executed. While a steady state clock eliminates this uncertainty, it would cause the pin count to increase by two times at both the DRAM and the buffer chip. Such increased pin count results in increased cost and power dissipation.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
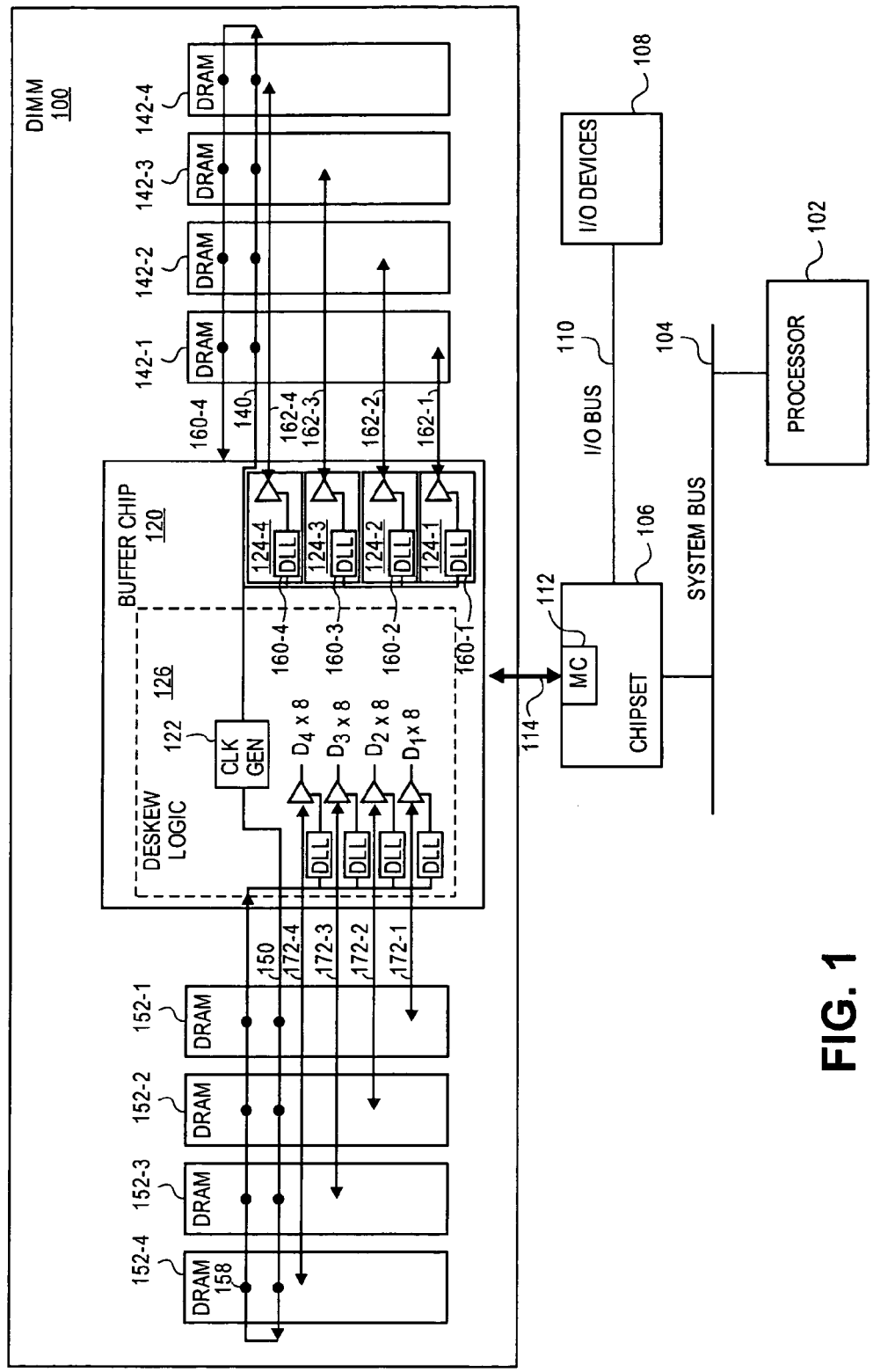
FIG. 1 is a block diagram of a system of one embodiment of the invention.

FIG. 1 is a block diagram of a system of one embodiment of the invention. A processor 102 is coupled by a system bus 104 to chipset 106. Chipset 106 provides an interface between the processor 102 and input/output (I/O) devices 108 via an I/O bus 110. Additionally, chipset 106 includes a memory controller 112 which communicates over a high speed link 114 to a buffer chip 120 of a dual inline memory module (DIMM) 100. In an alternative embodiment a single inline memory module (SIMM) may be used.

DIMM 100 maybe inserted into a memory card slot with a motherboard not shown. DIMM 100 includes two banks of memory units, a first bank (right bank) including dynamic random access memories 142-1 through 142-4 (collectively DRAM 142), and a second bank (left bank) including DRAMS 152-1 through 152-4, (collectively DRAM 152). More or fewer memory units may exist in each bank of memory units. In an alternative embodiment a single inline memory module (SIMM) may be used. Buffer chip 120 controls the reading and writing from the plurality of memory units, e.g., DRAMs 142 and 152. Buffer chip 120 maybe an integrated circuit (IC) fabricated using any conventional or subsequently developed technology.

Buffer chip 120 includes at least one clock generator 122 to generate and source a free running (continuous) clock signal. In one embodiment, separate clock generators exist for each bank of memory units. In another embodiment, the clock continuous signal from a single clock generator 122 is split and supplied to both banks of memory units.

In one embodiment, a clock signal is distributed serially through a subset of the memory units, e.g., DRAMs 142 along clockline 140. In one embodiment, the clock signal is passed in a ring serially through DRAM 142-1 to DRAM 142-2 to DRAM 142-3 to DRAM 142-4 and back through DRAM 142-4, DRAM 142-3, DRAM 142-2, DRAM 142-1 and then returns to the buffer chip 120. In one embodiment, the clock serves as a write clock as it moves through the memory units in decreasing proximity to the buffer chip 120 and serves as a read clock as it returns with increasing proximity to the buffer chip 120.

A point to point link between the buffer chip and each DRAM also exists. This point to point link is a path by which data may be sent to each DRAM. This path is also referred to herein as a data lane. In one embodiment, each datalane is 8 bits wide. Thus, data lanes 162-1 through 162-4 (collectively 162) and 172-1 through 172-4 (collectively 172) are shown. Use of the free running multi-drop clock reduces the pin count on both the DRAMs and the buffer chip over prior art strobing methods. However, the multi-drop clock topology results in a delay of the arrival of the clock signal at the DRAMs relative to the arrival of data (D1×8 through D4×8) over the point to point link. This delay increases with increasing distance from (decreasing proximity to) the buffer chip 120. Thus, the clock signal, assuming it is concurrently sent in quadrature with the data on data lane 162-4, would have a relationship furthest from quadrature when it arrives at DRAM 142-4. However, by providing timeshifters 124-1 through 124-4 (collectively 124) to timeshift data sent over datalanes 162, quadrature synchronization can be achieved at each of the inline memory units. Because the distance is known and the delay for each drop can be simulated, the delay for each timeshifter can be established in advance using delay lock loops (DLL) 160-1 through 160-4. In one embodiment, time shifter 124-1 may be omitted since the signal should arrive at the first DRAM in substantially the same relationship as it had departing the buffered chip 120. In another embodiment, timeshifters 124 may only be used for data lanes where the clock delay is determined to be likely to cause errors in writing valid data.

Similarly, the read clock is provided as a clock signal returns through each memory unit in series. Thus, for example, the read will be initiated at point 158. However, the clock signal will not return to the buffer chip 120 until after the read data is received at the buffer chip over datalane 172-4. Thus, it is necessary to delay the read data to synchronize with the returning clock. Deskew logic 126 provides for the deskewing of the phase relationship of the received data (D1×8 through D4×8) and the returning clock signal on signal line 150. A plurality of delay lock loops (DLL) may be employed to appropriately delay the clock to deskew this phase relationship. This ensures valid data (D1×8 through D4×8) will be returned to the memory controller 112 for use by the processor or other requesting device.

While the read operation has been described relative to the lefthand bank of memory units and the write operations have been described relative to the righthand bank of memory units, it should be understood that reading and writing occur over both banks of memory units and may be performed analogously on either side of the DIMM 100. Thus, in one embodiment, deskew logic is duplicated and is available for use by each bank of memory units. Similarly, timeshifters may be supplied for each bank of memory units. Moreover, as noted above, in one embodiment, two clock signal generators exist on buffer chip 120, one to supply a clock over signal line 140 and one to supply a clock over signal line 150. In another embodiment, a single clock generator is used to supply clocks over both signal line 140 and signal line 150.

Figure 2:
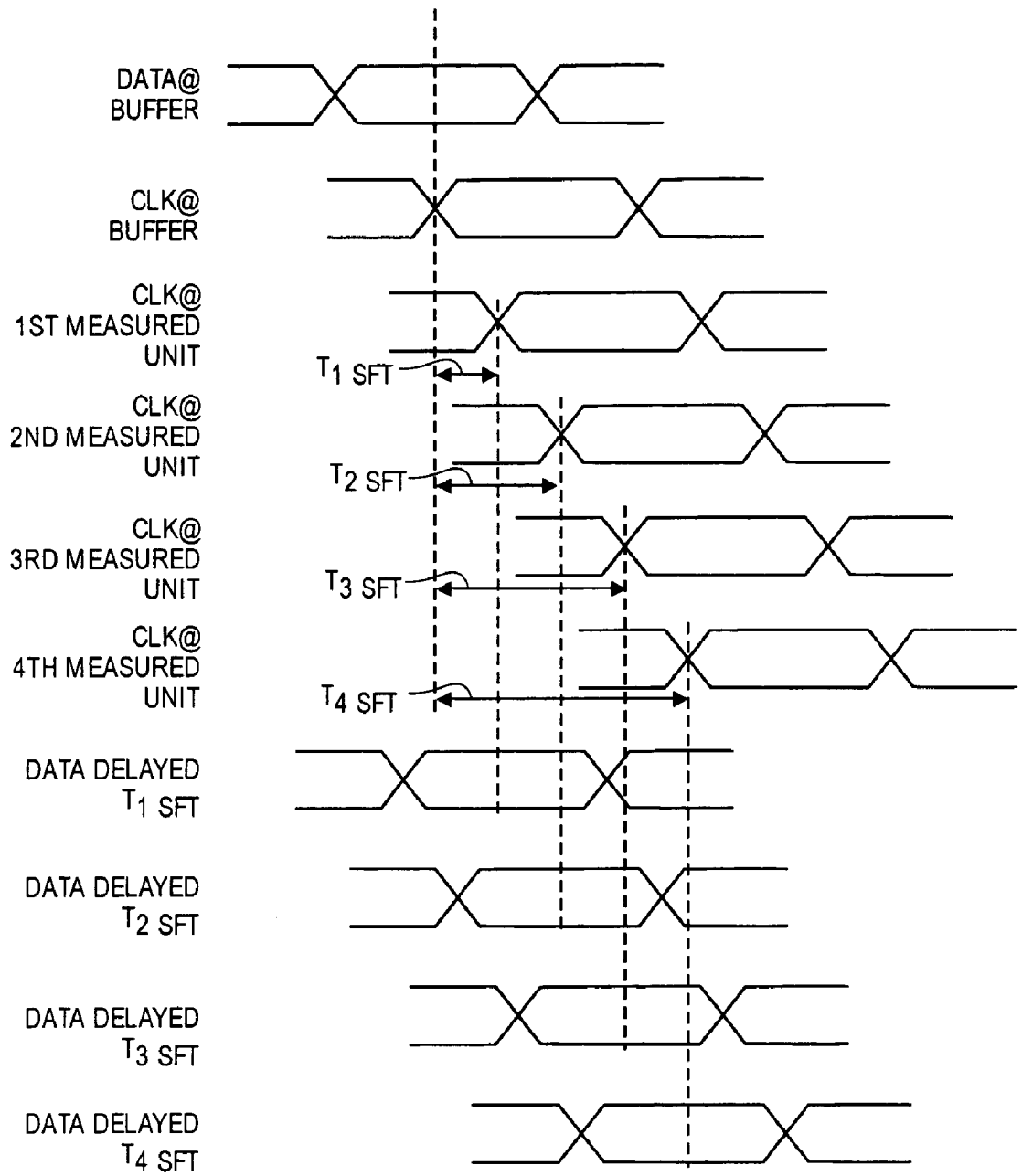
FIG. 2 is a timing diagram of timeshifting data to accommodate a resulting timeshift in a free running clock in one embodiment of the invention.

FIG. 2 is a timing diagram of timeshifting data to accommodate a resulting timeshift in a free running clock in one embodiment of the invention. As can be seen, the clock at buffer chip has a quadrature relation with the data. However, as the clock signal transitions through each successive memory unit, the timeshift $T_{1SFT}$, $T_{2SFT}$, $T_{3SFT}$, $T_{4SFT}$ becomes increasingly great. Thus, if the data were sent over the data lanes concurrently with the clock leaving the buffer, the memory units more distal to the buffer chip would be increasingly likely to write invalid data. Thus, within the buffer chip, a timeshift of the data is introduced to insure that the quadrature relationship between the clock at the memory module and the receipt of valid data is maintained.

Figure 3:
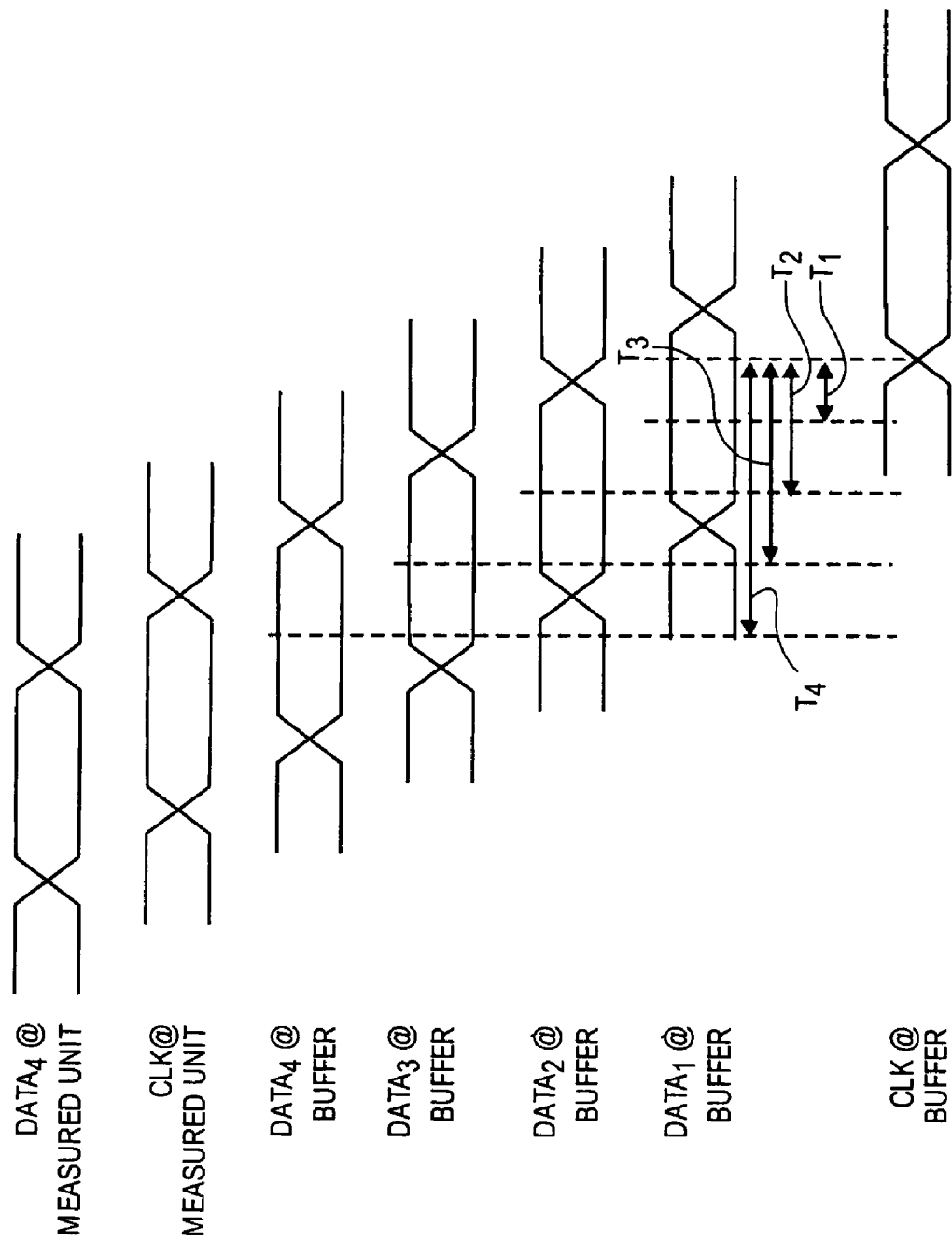
FIG. 3 is a timing diagram of an example of the free running clock in one embodiment of the invention.

FIG. 3 is a timing diagram of an example of the free running clock in one embodiment of the invention. The clock first appears recirculated at the memory unit most distant from the buffer chip. Because the memory unit does not have logic to insure any particular phase relationship with the clock, the memory unit places the data on the data lane in response to receipt of the clock without concern for phase relation/clock time. A decreasing clock skew relative to the data returned occurs as the clock returns to the buffer in increasing proximity for each successive memory unit. At the buffer, deskew logic insures the quadrature phase relationship by delaying the data from the respective memory units times $T_4$, $T_3$, $T_2$ and $T_1$ respectively. In this manner, deskew logic on the buffer chip insures valid data capture at the buffer chip.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
generating a continuous clock signal;
forwarding the clock signal serially through a plurality of memory units of a memory module in decreasing proximity to a clock source;
deskewing the clock signal in a buffer chip of the memory module relative to a data signal over a point to point link from a memory unit to the clock source; and
passing the clock signal serially back through the plurality of memory units in increasing proximity to the clock source.

2. A system comprising:
a processor;
a memory controller coupled to the processor;
a dual inline memory module (DIMM) coupled to the memory controller, the DIMM having a buffer chip to receive data directed to any of a plurality of memory units of the DIMM, the buffer chip to generate a clock signal to be passed in a ring through a subset of memory units and back to the buffer chip wherein the buffer chip comprises:
a delay logic to delay data delivery on a data lane based on proximity of a memory unit of the plurality of memory units to the buffer chip; and
a deskew logic in the buffer chip to align the clock signal returning from the memory units with data provided over the data lane of the DIMM.

3. The system of claim 2 wherein each memory unit comprises a dynamic random access memory (DRAM).

4. The system of claim 2 wherein the DIMM comprises:
a plurality of data lanes each providing a point to point link between the buffer chip and one memory unit.

* * * * *